(12) United States Patent
Mizutani et al.

(10) Patent No.: US 7,085,579 B2
(45) Date of Patent: Aug. 1, 2006

(54) MOBILE COMMUNICATION SYSTEMS, MOBILE STATIONS, BASE STATION CONTROLLERS AND PACKET DATA SERVICE NODES

(75) Inventors: Mika Mizutani, Cupertino, CA (US); Susumu Matsui, Machida (JP); Tetsuhiko Hirata, Yokohama (JP); Masashi Yano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 825 days.

(21) Appl. No.: 09/823,135

(22) Filed: Mar. 30, 2001

(65) Prior Publication Data

US 2001/0031634 A1 Oct. 18, 2001

(30) Foreign Application Priority Data

Apr. 17, 2000 (JP) .............................. 2000-121067
Aug. 16, 2000 (EP) .................................. 00117659

(51) Int. Cl.
*H04B 7/00* (2006.01)
*H04M 1/00* (2006.01)
*H04Q 7/20* (2006.01)
*H04Q 7/00* (2006.01)

(52) U.S. Cl. ...................... 455/512; 455/450; 455/451; 455/452.1; 455/517; 455/550.1; 370/329; 370/330; 370/331

(58) Field of Classification Search ................ 455/512, 455/450, 451, 452.1, 517, 67.11, 550.1, 55; 370/329, 330, 331
See application file for complete search history.

(56) References Cited

U.S. PATENT DOCUMENTS 5,991,642 A * 11/1999 Watanabe et al. ........... 455/560
6,097,961 A * 8/2000 Alanara et al. .............. 455/466
6,389,284 B1 * 5/2002 Cook et al. .................. 455/434
6,404,754 B1 * 6/2002 Lim ............................ 370/338
6,741,861 B1 * 5/2004 Bender et al. .............. 455/450
6,751,456 B1 * 6/2004 Bilgic ......................... 455/418

(Continued)

FOREIGN PATENT DOCUMENTS

EP 0332825 A 9/1989

(Continued)

OTHER PUBLICATIONS

3Gpp2 TSG-A Meeting Contribution, "Stage 3 description of Ax interface rev. 1" (3GPP2-AC0-19990927-0), Sep. 1999, Detray Beach, Florida.

(Continued)

*Primary Examiner*—George Eng
*Assistant Examiner*—Un C. Cho
(74) *Attorney, Agent, or Firm*—Townsend and Townsend and Crew LLP

(57) ABSTRACT

A mobile communication system with a packet switching function which enables sharing of radio resources among mobile stations, wherein a mobile station which has generated a request for communication quality assurance periodically sends a packet for requesting preferential use of a radio channel in order to prevent timeout of the state transition timer, timeout of which would cancel radio channel assignment to the mobile station and bring it into a dormant state if a certain period elapses without transmission or reception of a signal, so that it can remain in the active state and hold the radio channel continuously. In addition, when the mobile station requesting communication quality assurance moves from one cell to another or requests radio channel assignment, the base station controller controls the radio base station so that the mobile station can be assigned a radio channel by sending a priority request packet.

3 Claims, 14 Drawing Sheets

U.S. PATENT DOCUMENTS 6,834,050 B1 * 12/2004 Madour et al. ............. 370/392

FOREIGN PATENT DOCUMENTS

| EP | 0912016 A | 4/1999 |
|---|---|---|
| EP | 1021017 A | 7/2000 |
| JP | 06097943 | 4/1994 |

OTHER PUBLICATIONS

Cheng et al. "Comparison of Two Dynamic Channel Assignment Schemes Under Packet Data Traffic," 1998 IEEE 48th Vehicular Technology Conference, Ottawa, pp. 1765-1769 (1998).

* cited by examiner

| Transmission speed total for all mobile stations (kbps) | Interference level threshold (dBm/Hz) |
|---|---|
| 0 | -165 |
| 64 | -163 |
| 128 | -161 |
| 256 | -159 |
| 512 | -157 |
| 1024 | -155 |
| 2048 | -153 |

FIG.13

1301 Link layer connection control table

| Link layer connection identifier |
|---|
| IP address of MS |
| Resource state active/dormant |
| Uplink channel code |
| Downlink channel code |
| Packet escape queue |
| Priority management registration |
| Uplink channel transmission speed |
| Downlink channel transmission speed |
| Uplink channel SIR |
| Downlink channel SIR |
| Control pointer |

1302 — Resource state active/dormant
1303 — Priority management registration
1304 — Uplink channel transmission speed
1305 — Downlink channel transmission speed
1306 — Uplink channel SIR
1307 — Downlink channel SIR

FIG.14

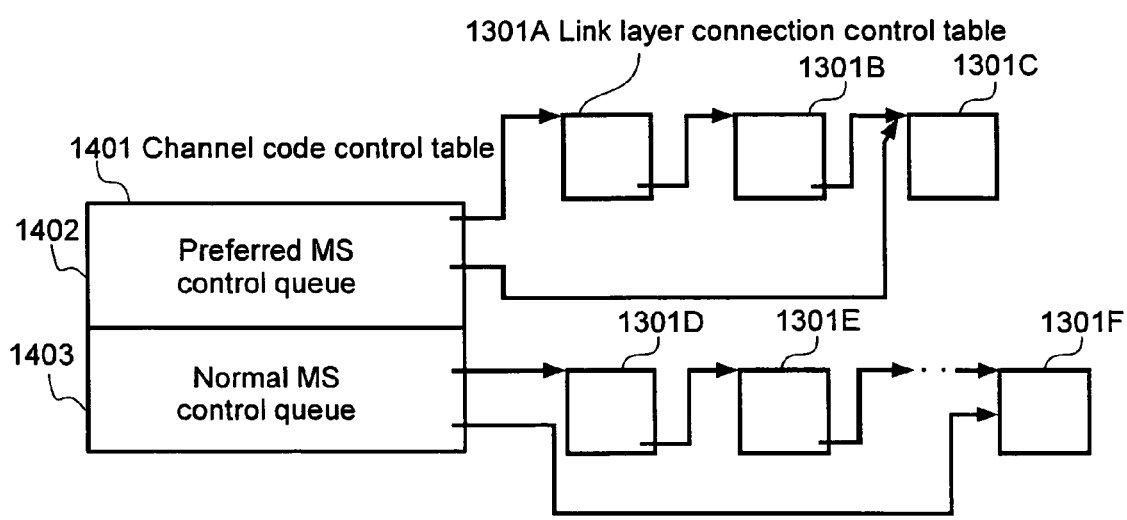

MOBILE COMMUNICATION SYSTEMS, MOBILE STATIONS, BASE STATION CONTROLLERS AND PACKET DATA SERVICE NODES

CROSS-REFERENCES TO RELATED APPLICATIONS

This application claims priority from Japanese Patent Application Reference No. 00-121067, filed Apr. 17, 2000.

BACKGROUND OF THE INVENTION

This invention relates generally to mobile communication systems, and particularly to a mobile communication methods for mobile stations, base station controllers and packet data service nodes.

Effective use of radio channels in mobile communication systems can be achieved using packet switching techniques to enable sharing of a radio channel among mobile stations. According to such techniques, when a request for signal transmission or reception is generated, each mobile station uses the assigned radio channel shared with other mobile stations to transmit or receive signals in the form of packets. Further, when there is no such request, the radio channel is freed to enable its use by another mobile station. Moreover, in such techniques, radio channel assignment to mobile stations in which no packet transmission or reception has taken place for a certain time period are canceled.

In conventional mobile communication systems, if a request for signal transmission or reception occurs in a mobile station canceled for radio channel assignment, it is necessary to begin with assignment of a radio channel to that mobile station. But there is a possibility that there is no free radio channel. In addition, in a mobile communication system, as a mobile station moves from one cell to another, the mobile station must be assigned a radio channel by the radio base station controlling the destination cell but again there is a possibility that there is no free radio channel. This may lead to problems in communication quality assurance for communications that require high reliability, such as electronic commerce.

What is needed are techniques for maintaining an assigned radio channel between mobile and non mobile units in a packet based mobile communications systems.

SUMMARY OF THE INVENTION

According to the present invention, techniques for maintaining an assigned radio channel between a mobile unit and a non mobile unit when preferential use of the radio channel is desired are provided. Embodiments according to the invention can maintain the radio channel regardless of the packet transmission or reception interval, and can further assign radio channels preferentially according to requests for radio channel assignment. Techniques according to the invention can be embodied in a mobile unit, such as a mobile station, cell phone, pager and the like, a non-mobile unit, such as a base station controller, and the like, or a packet data service node.

In a representative embodiment according to the present invention, a mobile station requesting preferential use of a radio channel periodically sends a priority request to a radio base station, which, upon receiving the priority request, periodically sends a reply to the priority-requesting mobile station. This means that signal reception and transmission take place periodically or at regular time intervals between the priority-requesting mobile station and the radio base station; therefore, if this interval is shorter than a time allowed before cancellation of radio channel assignment, the mobile station can keep being assigned the radio channel.

In addition, according to this invention, the base station controller which controls the radio base station has means to separately control preferred mobile stations using radio channels preferentially and other mobile stations, or non-preferred mobile stations, and also to control the non-preferred mobile stations in the order of length of time which has elapsed after their transmission to, or reception from, the radio base station of the last signal (radio channel non-use time). Thus, if mobile stations requesting preferential use of a radio channel request assignment of a radio channel and there is no free radio channel in the radio base station, the base station controller can release radio channel assignments from non-preferred mobile stations, in the descending order of length of their radio channel non-use time, and re-assign the released radio channels to the priority-requesting mobile stations.

Numerous benefits are achieved by way of the present invention over conventional techniques.

An object of this invention is the provision of a mobile station which has means to keep an assigned radio channel, when preferential use of a radio channel is required, regardless of the packet transmission or reception interval, and also to be assigned preferentially a radio channel when it requests radio channel assignment.

A further object of the invention is the provision of a base station controller having means to keep assigning a radio channel to a mobile station which has requested preferential use of a radio channel, regardless of the packet transmission or reception interval and, when a priority-requesting mobile station requests assignment of a radio channel, assign it a radio channel preferentially.

Another object of the invention is the provision of a packet data service node having means to enable preferential use of a radio channel by a mobile station which has requested preferential use of a radio channel.

A further object of the invention is the provision of a mobile communication method that can keep assigning a radio channel to a mobile station which has requested preferential use of a radio channel, regardless of the packet transmission or reception interval and, when a priority-requesting mobile station requests assignment of a radio channel, assign it a radio channel preferentially.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 13 shows an example of the structure of a link layer connection control table in the memory cache of BSC.

FIG. 14 shows an example of the structure of a channel code control table in the memory cache of BSC.

DESCRIPTION OF THE SPECIFIC EMBODIMENTS

Figure 1:
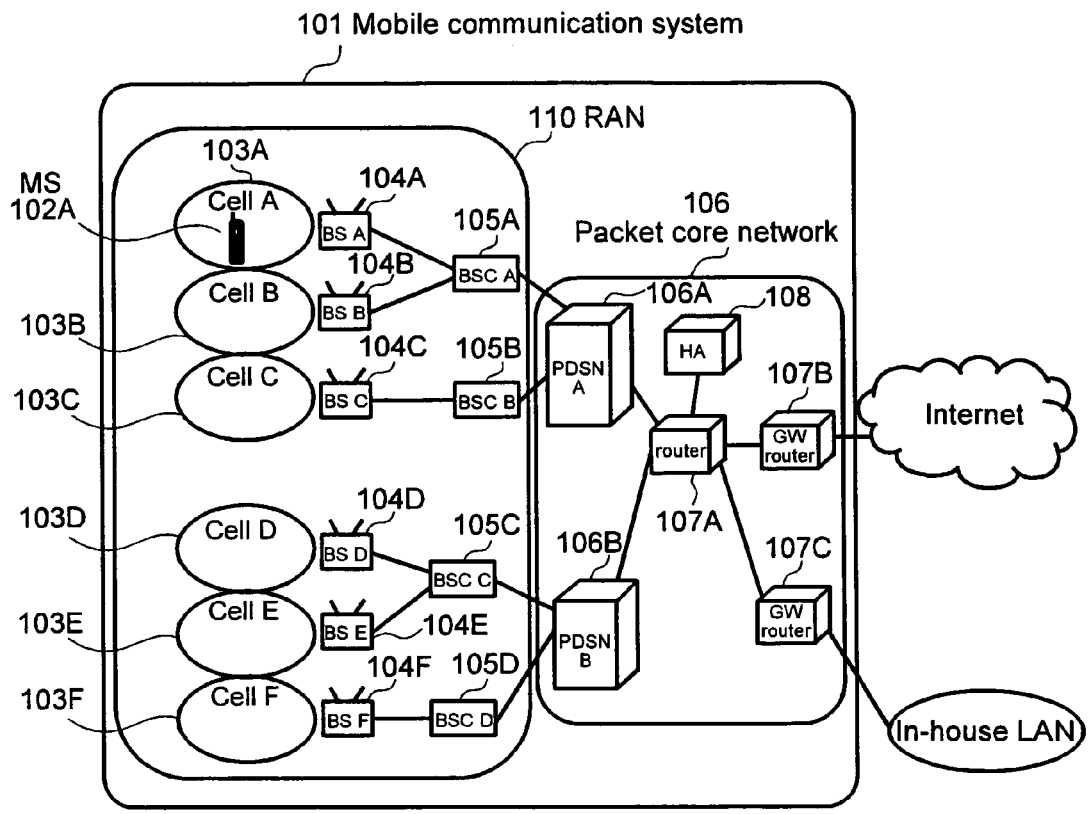
FIG. 1 shows an example of a mobile data communication system according to this invention.

Effective use of radio channels in mobile communication systems can be achieved using packet switching techniques to enable sharing of a radio channel among mobile stations. According to such techniques, when a request for signal transmission or reception is generated, each mobile station uses the assigned radio channel shared with other mobile stations to transmit or receive signals in the form of packets. Further, when there is no such request, the radio channel is freed to enable its use by another mobile station. Moreover, in such techniques, radio channel assignment to mobile stations in which no packet transmission or reception has taken place for a certain time period are canceled. For further information about packet wireless communication, reference may be had to a publication by 3rd Generation Partnership Project 2 (3GPP2), entitled, "Stage 3 description of Ax interface rev.1 (3gpp2-ACO-19990927-0)," the entire contents of which are incorporated herein by reference for all purposes.

In conventional mobile communication systems, if a request for signal transmission or reception occurs in a mobile station canceled for radio channel assignment, it is necessary to begin with assignment of a radio channel to that mobile station but there is a possibility that there is no free, radio channel. In addition, in a mobile communication system, as a mobile station moves from one cell to another, the mobile station must be assigned a radio channel by the radio base station controlling the destination cell but again there is a possibility that there is no free, radio channel. This may lead to a serious problem in communication quality assurance for communications that require high reliability, such as electronic commerce.

Embodiments according to the invention provide mobile communication systems, methods and apparatus having the capability to maintain an assigned radio channel. Responsive to a request by a mobile station for preferential use of a radio channel, in which the mobile station periodically sends a priority request to a radio base station, which, upon receiving the priority request, periodically sends a reply to the priority-requesting mobile station. This mechanism provides that signal reception and transmission take place periodically or at regular time intervals between the priority-requesting mobile station and the radio base station; therefore, if this interval is shorter than a time allowed before cancellation of radio channel assignment, the mobile station can keep being assigned the radio channel.

In addition, according to this invention, the base station controller which controls the radio base station can separately control preferred mobile stations using radio channels preferentially and other mobile stations, or non-preferred mobile stations. Further, the base station controller can control the non-preferred mobile stations in the order of length of time which has elapsed after their transmission to, or reception from, the radio base station of the last signal (radio channel non-use time). Thus, if mobile stations are requesting preferential use of a radio channel request assignment of a radio channel and there is no free radio channel in the radio base station, the base station controller can cancel radio channel assignments to non-preferred mobile stations, in the descending order of length of their radio channel non-use time, for example, and re-assign the freed radio channels to the priority-requesting mobile stations.

FIG. 1 shows the structure of a mobile data communication system 101 according to this invention. The system comprises of a radio access network (hereinafter called RAN) 110 and a packet core network 108, where the RAN, comprises of mobile stations (hereinafter called MS) 102, base stations (hereinafter called BS) 104 (104A–104F) which exchange signals with MS 102, located in service areas called cells 103 (103A–103F); and base station controllers (hereinafter called BSC) 105 (105A–105D) which comprehensively control the base stations 104, while the packet core network 109 comprises of packet data service nodes (hereinafter called PDSN) 106 (106A, 106B), which are connected with the radio access network 110 and have an IP packet routing function; a home agent (hereinafter called HA) 108 which enables mobile stations to move between PDSN 106A and 106B; gateway routers 107 (107B and 107C) for connection with external networks such as the Internet and an in-house LAN; and a router 107A which connects said gateway routers and PDSN 106.

Figure 2:
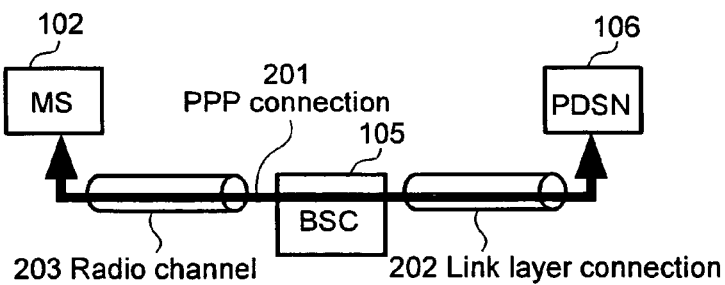
FIG. 2 shows an example of logical connection mapping between mobile station and PDSN.

FIG. 2 shows an example of mapping of connections between MS 102 and PDSN 106. A radio channel 203 is set between MS 102 and BSC 105 and a link layer connection 202 is set between BSC 105 and PDSN 106 so that PPP connection 201 is mapped on both the connections. Base station controller 105 controls the change in mapping of radio channel 203 and link layer connection 202 which occurs as a mobile station moves from one BS 104 to another BS 104, while PDSN 106 controls the change in mapping of PPP connection 201 and link layer connection 202 which occurs as a mobile station moves from one BSC 105 to another BSC 105.

Figure 4:
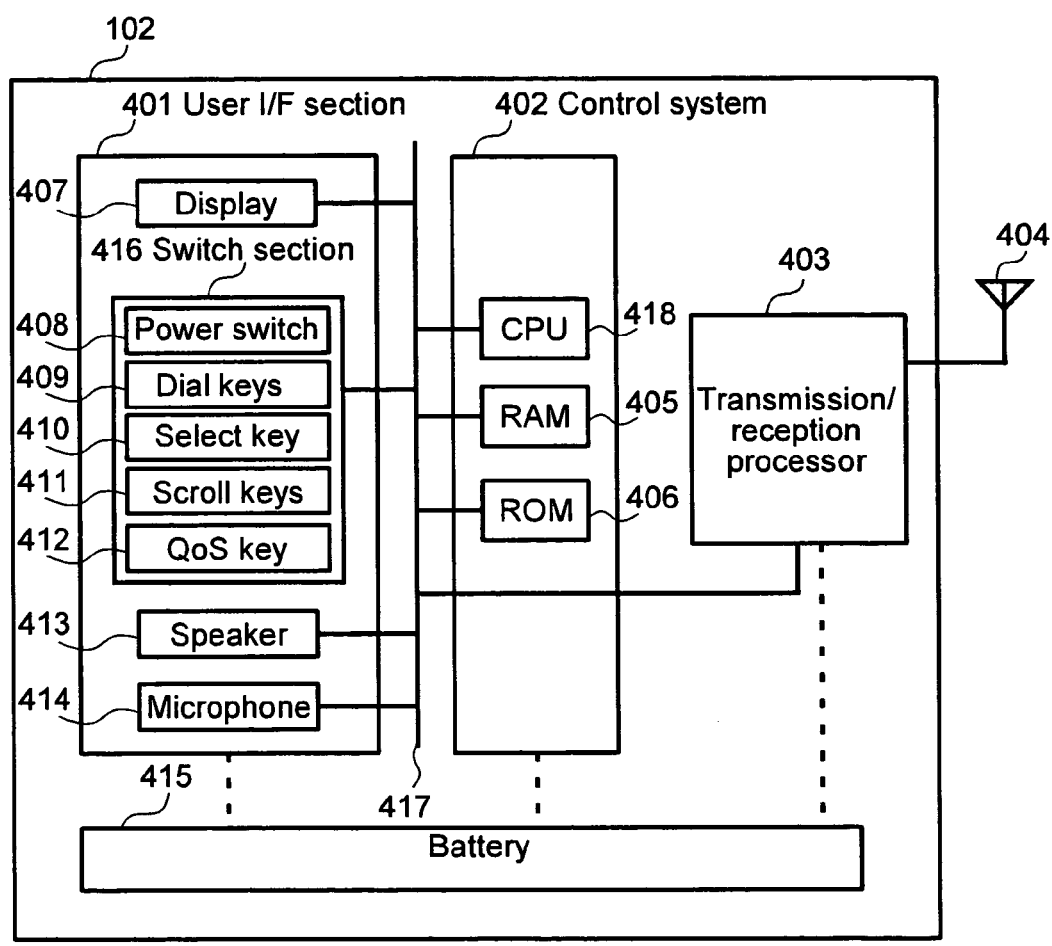
FIG. 4 shows an example of the structure of a mobile station.

FIG. 4 shows an example of the structure of MS 102 according to this invention. Mobile station 102 comprises of an antenna 404; a transmission/reception processor 403, which performs encoding and decoding to transmit or receive data through the antenna; a user interface section 401; a control section 402 which controls the user interface, carries out protocol processing of data and interfaces with the transmission/reception processor; and a battery 415. The user interface section 401 is composed of a display 407, a switch section 416, a speaker 413 and a microphone 414. The switch section 416 contains a power switch to turn on and off the power, 408; dial keys for entry of numerals and characters, 409; a select key which executes dialing, enables the commencement of talking with incoming lines and starts data service, 410; scroll keys to scroll the display, 411; and a QoS key to request communication quality assurance in accordance with inputs made by the user or instructions from the control section 402 which depends on the service used by the user, 412. The control section 402 comprises of a CPU 418, a ROM 406 and a RAM 405, where the CPU 418 starts the service depending on the request input from the switch section 416, performs transmission/reception traffic protocol processing related to the service and controls the display, the ROM 406 stores the programs concerned and the RAM 405 stores state information necessary for protocol processing and radio resource state information. A bus 417 interconnects 401, 402 and 403 in order to allow them to exchange data and programs.

Figure 5:
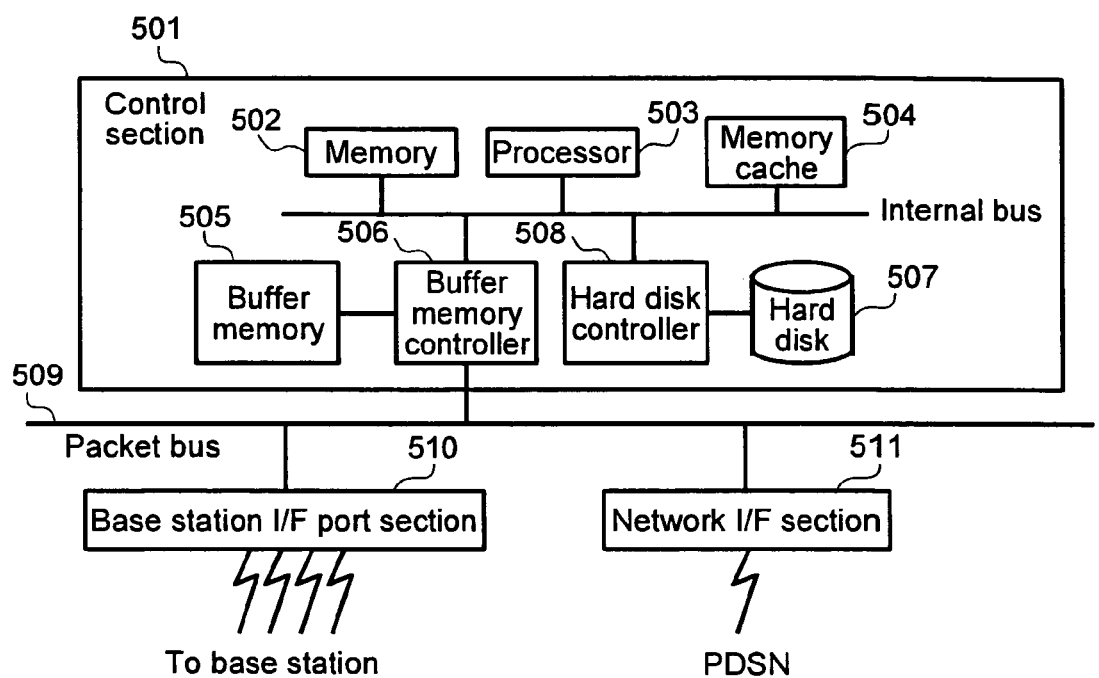
FIG. 5 shows an example of the structure of a base station controller.

FIG. 5 shows a representative structure for an example Base station controller, such as BSC 105, in a particular embodiment according to the present invention. Base station controller 105 comprises of a control section 501, a base station I/F port section 510 and a network I/F section 511. These sections are interconnected with each other through a packet bus 509. The control section 501 comprises of the following: a processor 503, which controls radio resources for each BS 104 and executes conversion between link layer connection 202 and radio channel 203; a memory 502 which stores the programs concerned; a memory cache 504 which contains tables to control radio channel codes as radio channel identifiers and tables for each MS to control radio channel information and radio resource states, a buffer memory 505 which temporarily stores data to be transmitted; a buffer memory controller 506; a hard disk 507; and a hard disk controller 508. The control section 501 is connected to base station 104 (four base stations in this embodiment) through the base station I/F port section 510. Further, control section 501 is connected to PDSN106 through the network I/F section 511.

Figure 6:
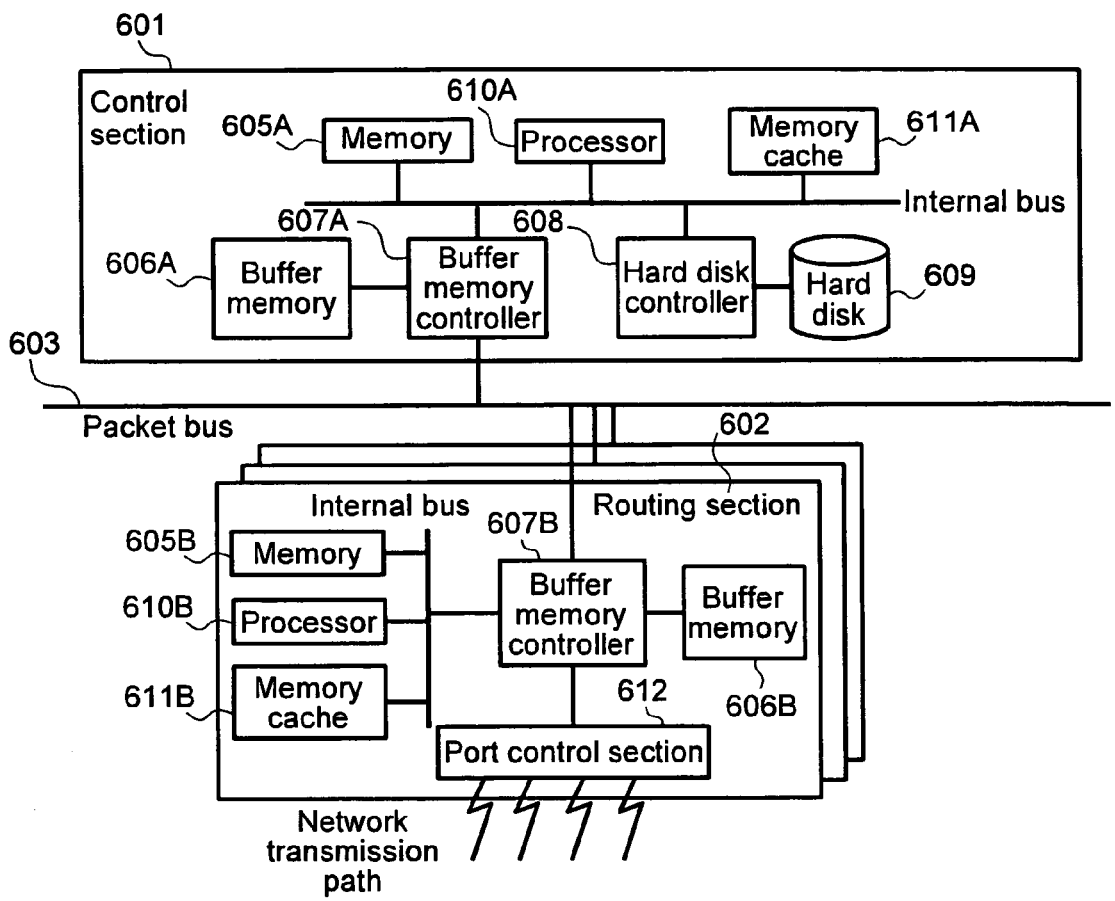
FIG. 6 shows an example of the PDSN structure.

FIG. 6 shows a representative structure for an example PDSN in a particular embodiment according to the present invention. Packet data service node 106A comprises a control section 601 and two or more routing sections 602, which are interconnected through a packet bus 603. The control section 601 comprises of the following: a memory 605A which stores a program to create packet routing tables; a processor 610A which executes that program; a memory cache 611A which contains packet routing tables and information about mobile stations, for example; a buffer memory 606A which stores packets, 505; a buffer memory controller 607A which comprises a function for DMA transfer of packets to and from the buffer memory 606A of the routing section 602, and a function of packet bus control; a hard disk controller 608; and a hard disk 609.

The packet routing table created by the processor 610A is used to control mobile IP processing; (including processes of collecting position information for the Mobile Stations 102 present in the mobile data communication system 101 and notifying Home Agent 108), establishing a PPP connection 201 with MS 102, establishing a link layer connection 202 with BSC 105, associating a mobile IP tunneling and PPP connection 201, and associating a PPP connection 201 and link layer connection 202.

The routing section 602 comprises a processor 610B which executes packet transmission between HA 108 and BSC 105 according to the packet routing table created by the control section. Further, routing section 602 can include a memory 605B; a buffer memory 606B; a buffer memory controller 607B; a memory cache 611B which contains the packet routing table created by the control section, a port control section 612 which connects another router 107; and an internal bus. In this figure, one port control section 612 supports four ports and, in this embodiment, connections with more than one router 107 and more than one BSC 105 are made through these ports.

Figure 7:
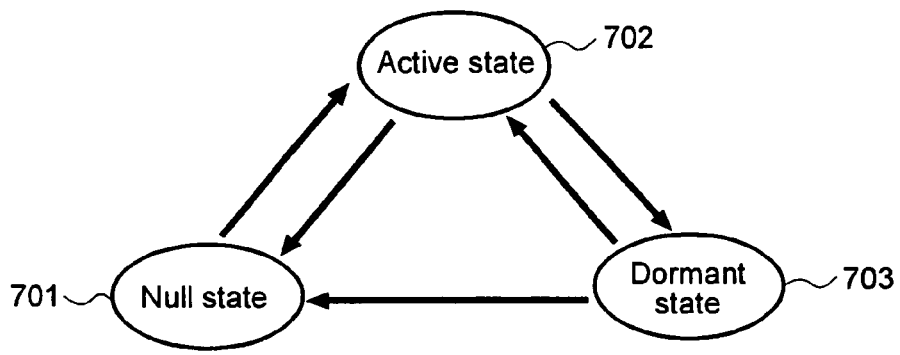
FIG. 7 shows resource state transition in packet switching.

FIG. 7 shows a representative radio resource state transition diagram of packet switching in a particular embodiment according to the present invention. FIG. 7 illustrates three states: a null state 701, in which MS 102 is not connected to the mobile data communication system 101 (the power is off or data communication is impossible); an active state 702, in which MS 102 is connected to the mobile data communication system 101 and is assigned a radio channel; and a dormant state 703, in which MS 102 is connected to the mobile data communication system 101 but is not assigned a radio channel. With MS 102 in its active state 702, if a certain time has elapsed without transmission or reception of a signal, the radio channel assignment to the Mobile Station is canceled and the state shifts into the dormant state 703. In this specific embodiment of a mobile data communication system, mobile stations in the active state 702 can exchange packets with BS 104, while, in order to transmit or receive packets, mobile stations in the null state 701 or dormant state 703 request BSC 105 to assign them radio channels using random access channels or control channels. Upon having been assigned radio channels under the control of BSC 105, the mobile station can shift into the active state 702. A MS 102 which has failed to shift into the active state can request radio channel assignment again after a certain period has elapsed.

To enable state transitions as shown in FIG. 7, the control section 501 of BSC 105 is provided with a state transition timer 901B for each MS 102 so that when BSC 105 transmits a signal to, or receives a signal from, a MS 102, it restarts the state transition timer 901B corresponding to that Mobile Station. This process is illustrated graphically in FIG. 9. When this timer times out (a preset time expires), BSC 105 releases the radio channel from the corresponding MS 102, which then shifts from the active state 702 to the dormant state 703. In conventional mobile data communication systems, even if a mobile station is making communications which require high reliability, such as real-time applications and electronic commerce, if a certain time period has elapsed without any signal transmission or reception, resource state transition into the dormant state, i.e., state 703, occurs and the radio channel is released. Furthermore, since free radio channels are not always available, there may be a case in which the communication service concerned will become unavailable.

To overcome problems inherent to conventional technologies, when preferential use of a radio channel is needed, embodiments according to the present invention can inhibit state transitions, such as from the active state 702 to the dormant state 703, responsive to the user pushing the QoS key 412 of MS 102 or the control section 402 of MS 102 giving an instruction for preferential use of a radio channel, for example. Depending on the service in use by the user, in specific embodiments, the MS 102 can hold the radio channel continuously.

Figure 8:
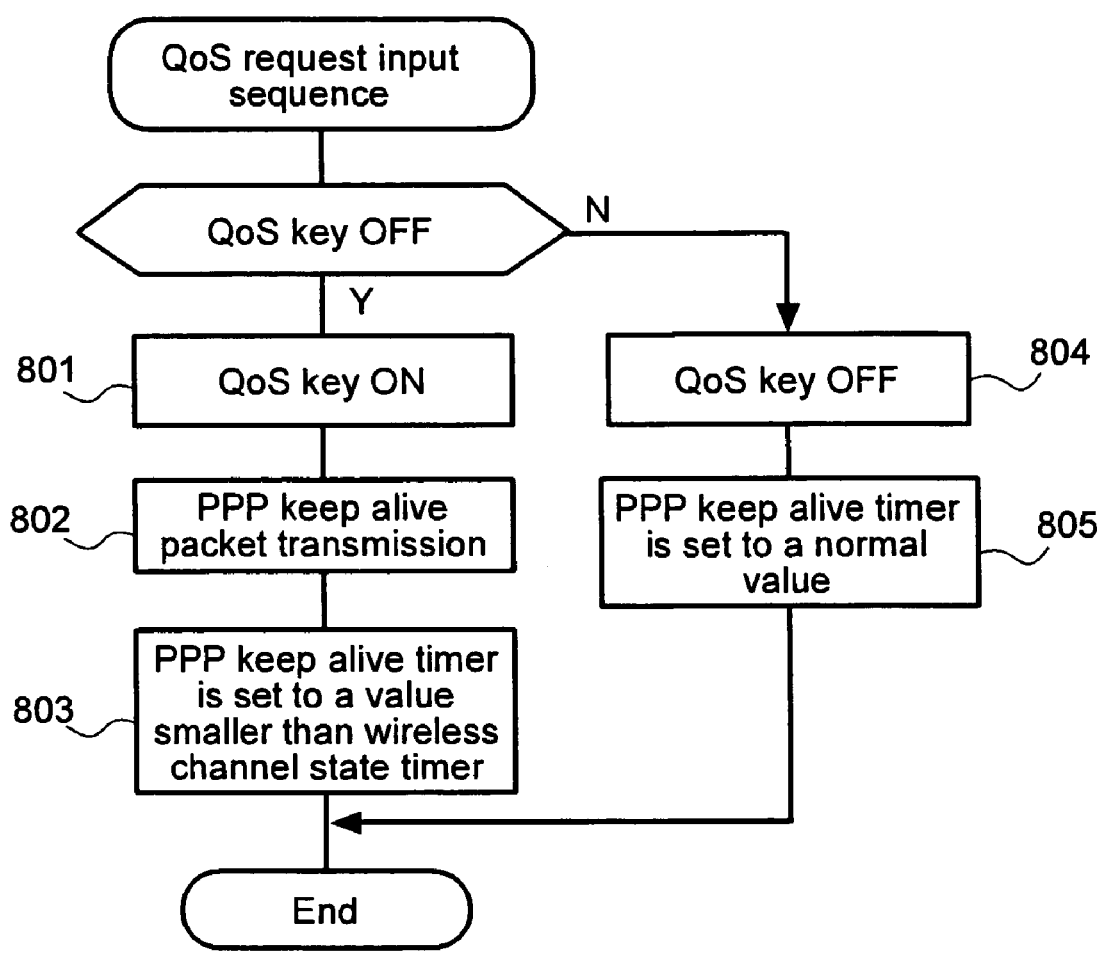
FIG. 8 is a flowchart showing a sequence for a mobile station to hold a radio channel.
Figure 18:
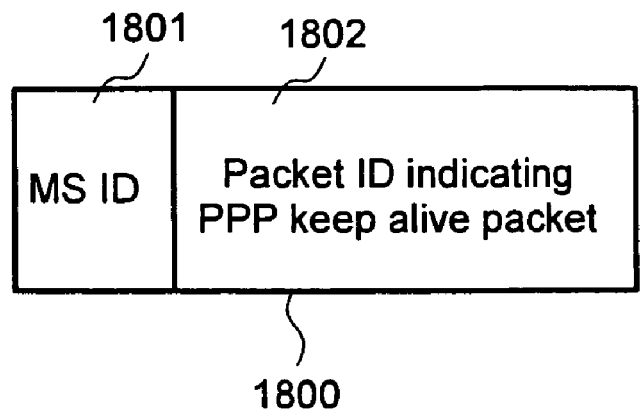

FIG. 8 shows a flowchart of a representative processing of a priority request input sequence in a particular embodiment according to the present invention. The processing illustrated by FIG. 8 can take place in MS 102, for example, in order to continuously hold the radio channel assigned by BS 104. When the user inputs to the QoS key 412, or when the control section 402 gives an instruction for preferential use depending on the service or application in use by the user, then, as illustrated by a step 801, the MS 102 turns on the QoS key. In a step 802, MS 102 can transmit PPP keep alive packet at regular intervals in order to prevent BSC 105 from releasing the radio channel from the MS. Structure of the PPP keep alive packet 1800 is shown in FIG. 18. The PPP keep alive packet has MS ID field 1801 and packet ID field 1802 indicating that the packet is a PPP keep alive packet. If the communication system adopts CDMA scheme and the network can recognize the MS from the spreading code used in the packet, the MS ID field 1801 is not necessary. Then, in a step 803, MS 102 sets the PPP keep alive timer 902, provided in its control section 402, for measuring PPP keep alive packet transmission intervals, to a value smaller than the value set on the wireless channel state timer 901A. Wireless channel state timer 901A is in the Control Unit 402 in the MS 102, and measures the period between the last transmission/reception to/from BSC 105 and the release of assigned wireless channel by BSC 105. Therefore the Wireless channel state timer 901A measures in the same way as the State transfer timer 901B as a result.

Figure 9:
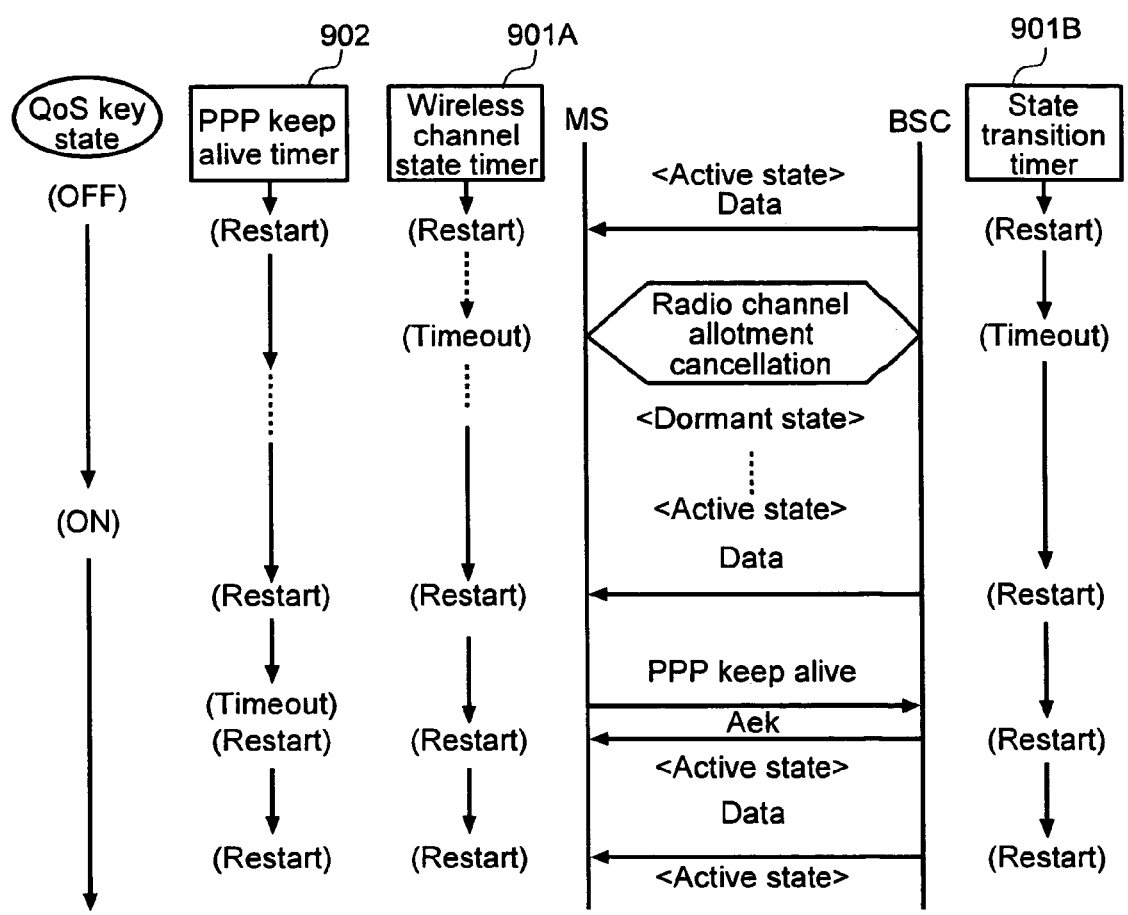
FIG. 9 shows the relationship among the state transition timer, PPP keep alive timer and QoS key state.
Figure 19:
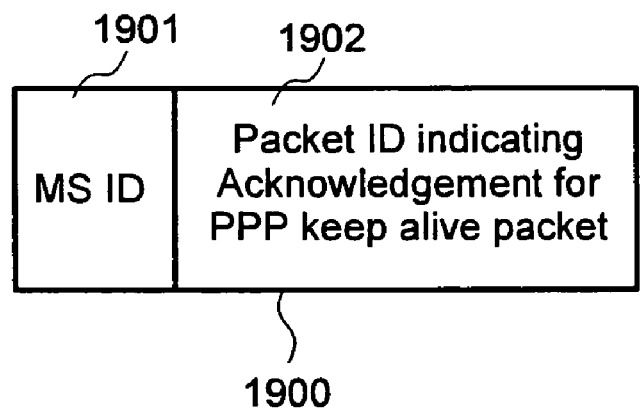

FIG. 9 shows an example of relationship among the wireless channel state timer 901A, the state transition timer 901B PPP keep alive timer 902 and QoS key state. With the QoS key 412 on, because the PPP keep alive timer 902 is set to a value smaller than the wireless channel state timer 901A, the PPP keep alive timer 902 times out before timeout of the state transition timer 901B which would cause the release of the radio channel from MS 102 and the change of the state of MS 102 from the active state 702 to the dormant state 703. When the PPP keep alive timer 902 has timed out but the wireless channel state timer 901A has not timed out yet, MS 102 sends a PPP keep alive packet. As BSC 105 receives the PPP keep alive packet, it sends an acknowledgement packet to MS 102. Structure of the acknowledgement packet 1900 for the PPP keep alive packet is shown in FIG. 19. The PPP keep alive packet has MS ID field 1901 and packet ID field 1902 indicating that the packet is an acknowledgement packet. If the communication system adopts CDMA scheme and the network can recognize the MS from the spreading code used in the packet, the MS ID field 1902 is not necessary. Mobile station 102 restarts the wireless channel state timer 901A upon transmitting the PPP keep alive packet or receiving the acknowledgement packet from BSC 105, while BSC 105 restarts the state transition timer 901B upon receiving the PPP keep alive packet from MS 102 or transmitting the acknowledgement packet to MS 102, so that release of radio channel can be avoided.

When the user inputs to the QoS key 412 again at the end of use of service or when the control section 402 gives an instruction for cancellation of preferential use of the radio channel at the end of use of service, the QoS key is turned off in a step 804. Then, in a step 805, the PPP keep alive timer 902 is set to a normal value, or a value larger than the one set on the wireless channel state timer 901A. If a certain period has elapsed without any packet transmission or reception, the state transition timer 901B times out earlier than the PPP keep alive timer 902, the wireless channel is release from the MS 102, and the state of the MS 102 transfers into the dormant state 703. After the transition into the dormant state, when the PPP keep alive timer 902 times out, MS 102 does not send a PPP keep alive packet as long as the wireless channel state timer 901A is still time out.

Figure 17:
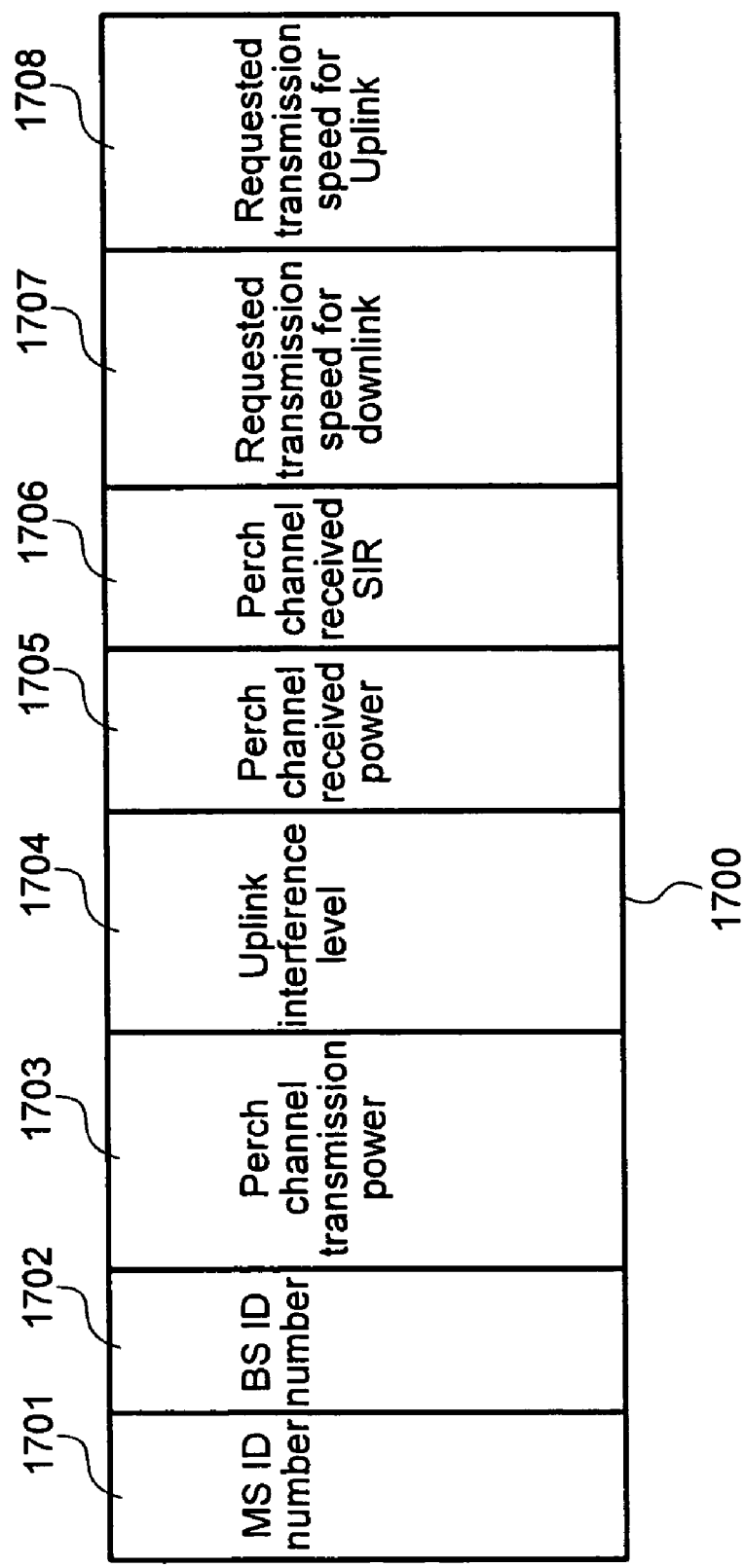
FIGS. 17–20 show structures of a example request packets.

When MS 102 shifts from its dormant state into its active state, or when MS 102 moves from one cell to another, it requests radio channel assignment from BSC 105 by the use of a random access channel or control channel. FIG. 17 shows a representative composition of a radio channel assignment request packet as an example. Here, 1701 represents the MS ID number that is requesting channel assignment and 1702 represents the BS ID number to which the MS is requesting the channel assignment. A field 1703 represents the transmission power level in a perch channel (hereinafter called BCCH) through which BS 104 is transmitting signals, while field 1704 represents the interference level in the uplink channel. A field 1705 denotes the received power of BCCH measured in MS 102 and 1706 the received SIR of BCCH. A field 1707 denotes the requested transmission speed of the downlink channel and 1708 that of the uplink channel. Some specific embodiments may comprise other informational fields, or may omit one or more of the fields illustrated in FIG. 17 without departing from the scope of the claimed invention. When MS 102 moves from one cell to another, BSC 105 can automatically catch the radio channel assignment request due to that movement without part or all of the information shown in FIG. 17, because BSC 105 knows the service and the transmission speed of channels used by that MS.

In a representative embodiment according to the present invention, base station controllers periodically collect from BS 104 communication quality information for each cell, such as desired signal level (RSSI), interference signal level (ISSI), desired-to-undesired signal ratio (SIR) and frame error rate (FER), and stores it in the memory 502. As BSC 105 receives the request for radio channel assignment from MS 102, it decides whether to assign a radio channel to that MS 102, depending on whether the predicted interference level is within a predetermined allowable range. The information on the cell in the memory 502, as well as information included in the radio channel assignment request packet, such as the requested transmission speed, SIR of BCCH and uplink channel interference level, are used for the processor 503 to predict how much the communication quality will deteriorate if a radio channel is assigned to the assignment requesting mobile station. Alternatively, the BSC105 can specifically predict what the interference level will be if radio channel assignment to the requesting mobile station takes place. Also, in specific embodiments, instead of using an interference level, the base station controller may decide whether to assign a radio channel depending on whether the transmission speed total for all active mobile stations connected to the base station to which the MS is requesting radio channel assignment, exceeds a preset threshold. For further description of communication quality information, reference may be had to a publication entitled, "ARIB STD-T53, a standard for CDMA portable mobile telephone systems established by the Association of Radio Industries and Businesses (ARIB)," the entire contents of which are incorporated herein by reference for all purposes.

Figure 10:
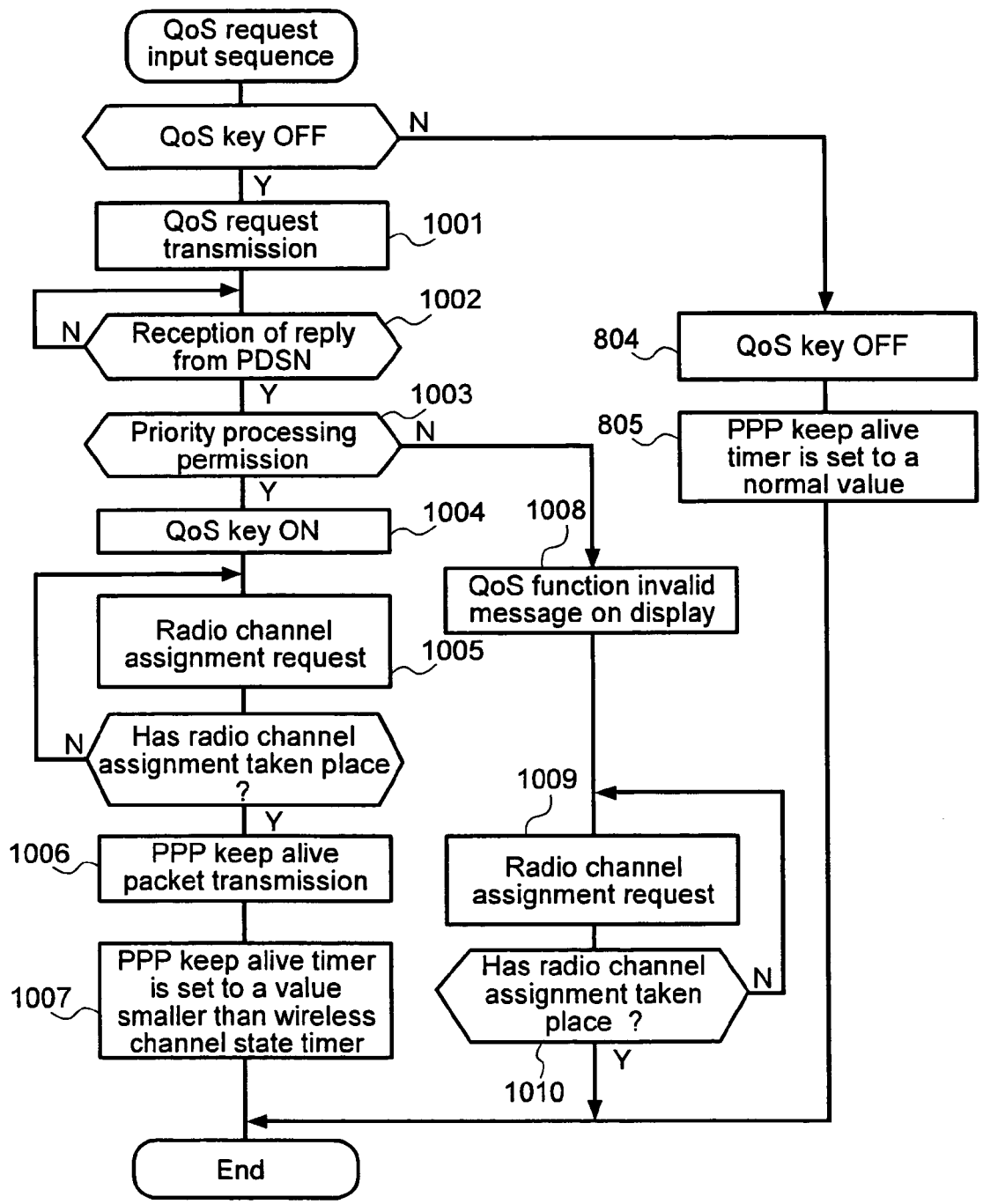
FIG. 10 is a flowchart showing a sequence for a mobile station to be assigned a radio channel preferentially to continue to use the channel.
Figure 20:
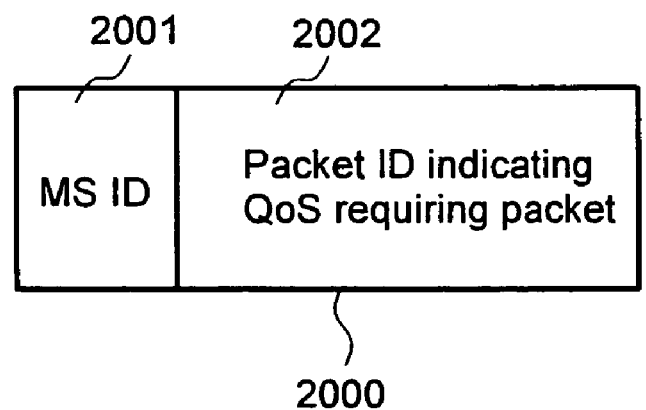

FIG. 10 shows a flowchart of a representative priority request input sequence in a particular embodiment according to the present invention. The MS 102 can use such a sequence to enable the user requesting preferential use of a radio channel to be assigned a radio channel preferentially and to be able to use the assigned channel continuously. When the user inputs to the QoS key 412, or when the control section 402 gives an instruction for preferential use of a radio channel, depending on the service selected by the user, then, in a step 1001, MS 102 transmits a QoS requesting packet to the PDSN106 connected to it. If the prior MS 102 moves between cells and the BSC 105 has already recognized the MS as the MS requesting preferential channel assignment, the QoS requesting packet transmission is not necessary for that prior MS. Structure of the QoS requesting packet 2000 is shown in FIG. 20. The QoS requesting packet has MS ID field 2001 and packet ID field 2002 indicating that the packet is a QoS requesting packet.

If the communication system adopts CDMA scheme and the network can recognize the MS from the spreading code used in the packet, the MS ID field 2001 is not necessary. Having received the QoS requesting packet and decided whether or not to permit preferential channel management for MS 102, the PDSN 106 transmits a reply which is awaited by MS 102 in a step 1002. If, in step 1003, the reply is determined to be affirmative, then, in a step 1004, the QoS key is turned on and in a step 1005, a request for radio channel assignment is sent to BSC 105. When the radio channel assignment request is made due to movement of MS 102 from one cell to another, BSC 105 may automatically knows the radio channel assignment request. If BSC 105 does not permit radio channel assignment, such request may be issued again after a certain period of time has elapsed. If BSC 105 permits radio channel assignment, as described herein with reference to FIG. 8, then in a step 1006, the MS 102 sends a PPP keep alive packet at regular intervals in order to hold the PPP connection 201. Then, in a step 1007, the PPP keep alive timer 902 is set to a value smaller than the wireless channel state timer 901A. With this setting, MS 102 can hold its active state 702. If the subscription contract for MS 102 prevents PDSN 106 from permitting preferential channel management, then, in a step 1008, the display of that mobile station MS 102 shows that the QoS function is invalid. If that is the case, then in a step 1009, the MS 102 requests radio channel assignment from BSC 105, as an ordinary mobile station, or a mobile station which is not preferentially controlled. If it is not assigned a radio channel, it may make the same request again after a certain period of time. If it is assigned a radio channel, the MS 102 does not send a PPP keep alive packet because it is not subject to preferential control. When the user inputs to the QoS key 412 again at the end of use of service, or when the control section 402 gives an instruction for cancellation of preferential use of the radio channel at the end of use of service, then in a step 804, the QoS key is turned off. Then, in a step 805, the PPP keep alive timer 902 is set to a normal value, or a value larger than the one set on the wireless channel state timer 901A.

Figure 11:
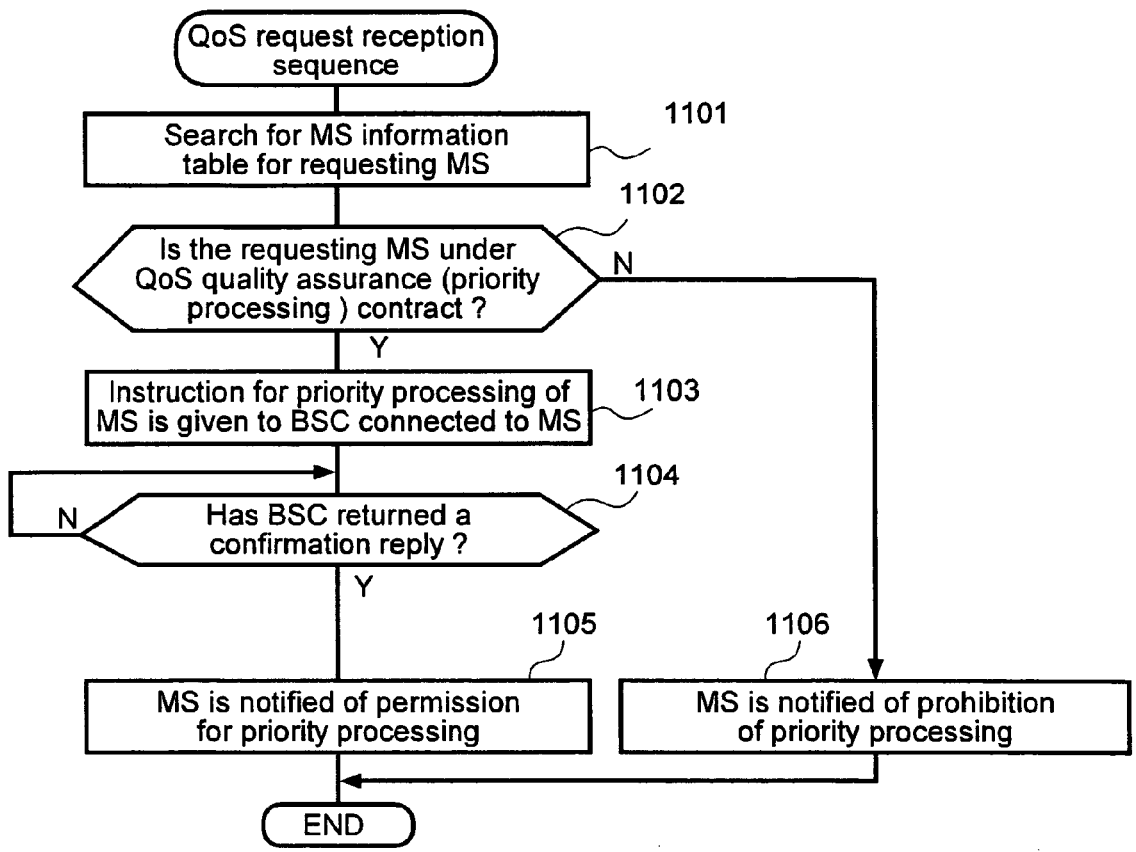
FIG. 11 is a flowchart showing a processing sequence in PDSN which has received a QoS request.
Figure 12:
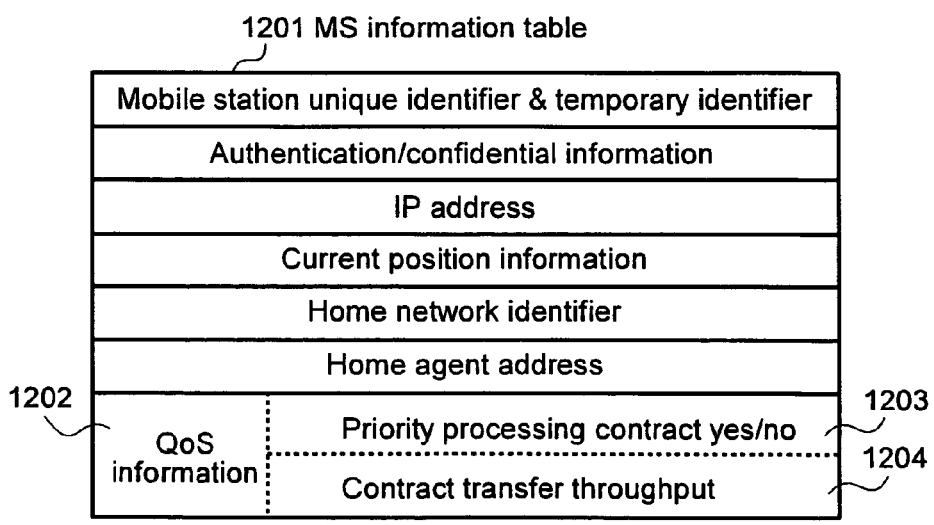
FIG. 12 shows an example of the structure of a mobile station information table in the memory cache of PDSN.

FIG. 11 shows a flowchart of representative processing by a packet data service node responsive to a QoS request from a mobile station in a particular embodiment according to the present invention. In FIG. 11, PDSN 106 has received a QoS request from MS 102. FIG. 11 illustrates processing that is carried out at the processor 610A in the control section 601 of PDSN 106. After receiving the QoS request, PDSN 106 searches the mobile station information table 1201 corresponding to the requesting mobile station in a step 1101. FIG. 12 shows a representative structure of a mobile station information table 1201 as an example. The mobile station information table is located in the memory cache 611A of PDSN 106. The table 1201 contains a mobile station unique identifier obtained from the subscriber information and a temporary mobile station identifier assigned after connection with the mobile communication network; authentication and confidential information; IP address in use by mobile station; positional information; home network identifier; home agent address; and QoS contract service information 1202 comprising of information on existence of a priority processing contract 1203 and contract transfer throughput 1204. Some specific embodiments may comprise other informational fields, or may omit one or more of the fields illustrated in FIG. 12 without departing from the scope of the claimed invention.

After searching the mobile station information table, in a step 1102, the PDSN 106 checks the QoS service information 1202 to see if the mobile station is under the contract for priority processing. If the mobile station is not, then, in a step 1106, it informs the MS 102 that preferential control is unavailable. On the other hand, if it is under the contract for priority processing, then in a step 1103, the PDSN 106 gives an instruction for priority processing of the MS 102 to the BSC 105 connected to the MS 102. In a step 1104, the BSC 105 returns a reply for confirmation, and in a step 1105, notifies the mobile station that it can be preferentially controlled.

Base station controller 105 is provided with a link layer connection control table 1301 for each mobile station in order to control mapping of link layer connection 202 and the radio channel 203 assigned to the MS 102. FIG. 13 shows a representative structure of a link layer connection control table 1301 as an example. Located in the memory cache 504 of BSC 105, the link layer connection control table 1301 comprises a link layer connection identifier; mobile station IP address; resource state information 1302; uplink channel code and downlink channel code to identify the radio channel 303; packet escape queue; presence or absence of priority request 1303; uplink channel transmission speed 1304; downlink channel transmission speed 1305; uplink channel SIR 1306; downlink channel SIR 1307; and a control pointer. Some specific embodiments may comprise other informational fields, or may omit one or more of the fields illustrated in FIG. 13 without departing from the scope of the claimed invention.

The BSC 105 is also provided with a channel code control table 1401 for each of the cells 103 under the control of BS 104 in order to control the radio channel codes in use and enable preferential channel management. FIG. 14 shows a representative structure of a channel code control table 1401 as an example. The channel code control table 1401, located in the memory cache 504 of BSC 105, comprises of two queues: one is a preferred mobile station control queue 1402, which registers link layer connection control tables 1301 for the MS 102 under the preferential channel management. The other is a normal mobile station control queue 1403 which registers link layer connection control tables 1301 for the MS 102 under the priority processing contract but not under the preferential channel management, as well as the ones not under the priority processing contract. Each time MS 102 transmits or receives a signal through a radio channel, the link layer connection control table 1301 corresponding to that MS 102 is re-registered at the top of the control queue 1402 or 1403 by the processor 503 located in the control section 501 of BSC 105. Therefore, link layer connection control tables 1301 are registered in the control queues 1402 and 1403, from top to bottom thereof, in the ascending order of length of time which has elapsed after reception or transmission of the final signal, or according to the rule that the table with the shortest non-use time is registered first and that with the longest non-use time is registered last.

Figure 15:
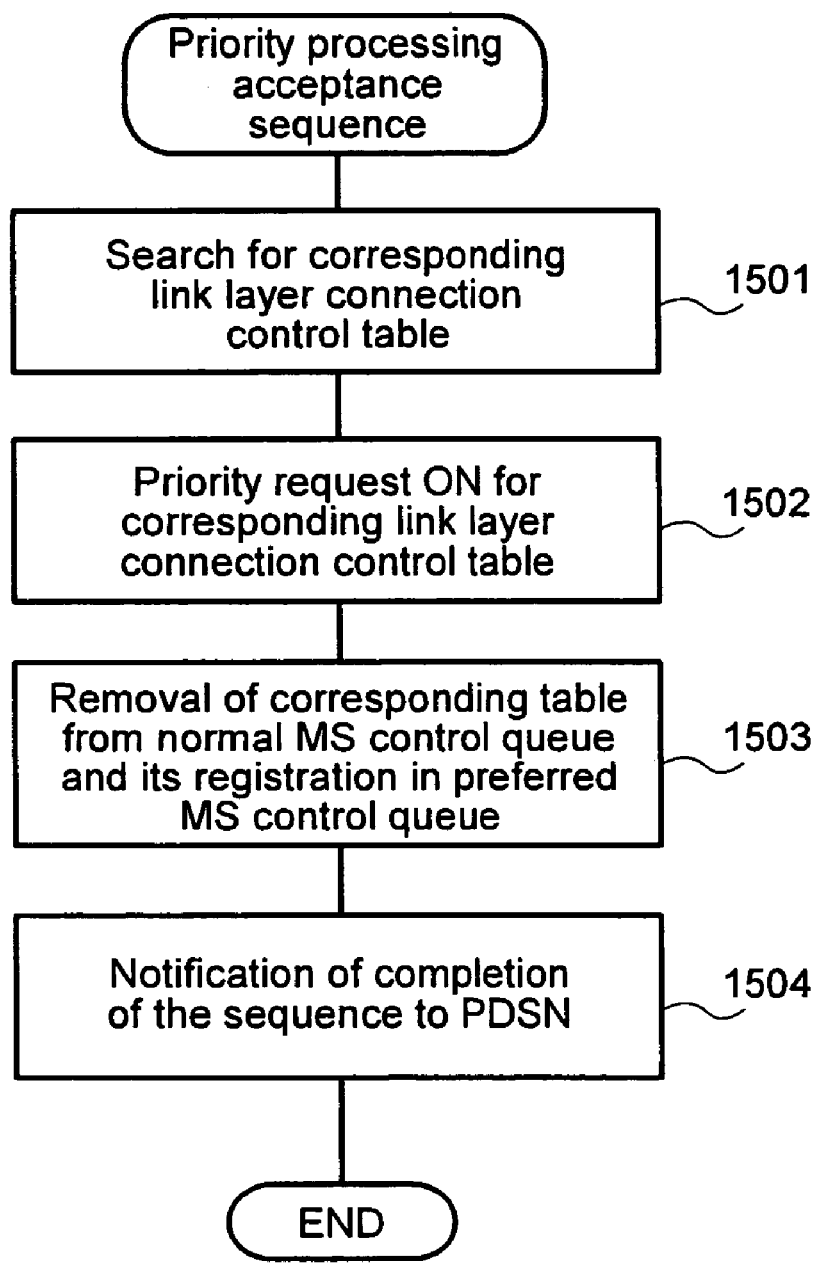
FIG. 15 is a flowchart showing a processing sequence for BSC which has accepted an instruction for priority processing.

FIG. 15 shows a flowchart of representative processing in a base station controller which has accepted the instruction for priority processing from a packet data service node in a particular embodiment according to the present invention. This processing is executed by the processor 503 located in the control section 501 of BSC 105 responsive to an instruction for priority processing from PDSN 106, for example. In FIG. 15, a mobile station MS 102 is already in its active state, and has transmitted QoS requesting packet to PDSN 106. The PDSN 106 has given BSC 105 an instruction for priority processing of the mobile station. In a step 1501, base station controller 105 searches the link layer connection control table 1301 corresponding to the MS 102 which should be processed preferentially. Then, in a step 1502, base station controller 105 turns Z on the priority request 1303 in the corresponding table. In a step 1503, this table is removed from the normal mobile station control queue 1403 in the channel code control table 1401 and re-registered at the top of the preferred mobile station control queue 1402. In a step 1504, the PDSN 106 is notified of completion of processing in response to the priority processing instruction.

Figure 3:
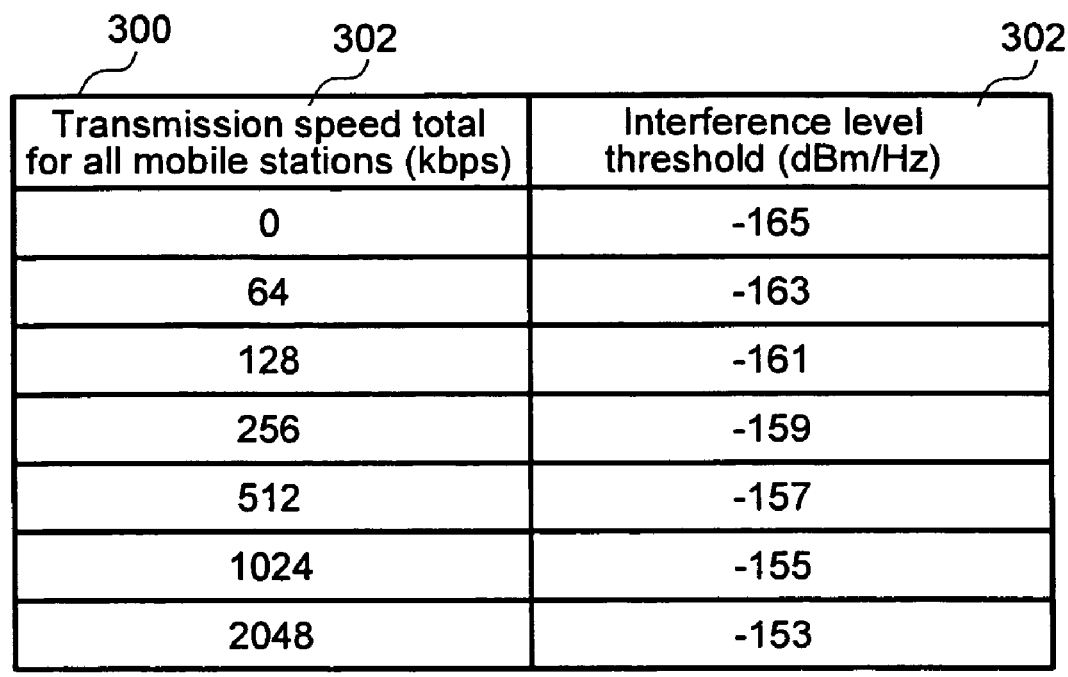
FIG. 3 shows an example of threshold when radio channel assignment is made to mobile station.
Figure 16:
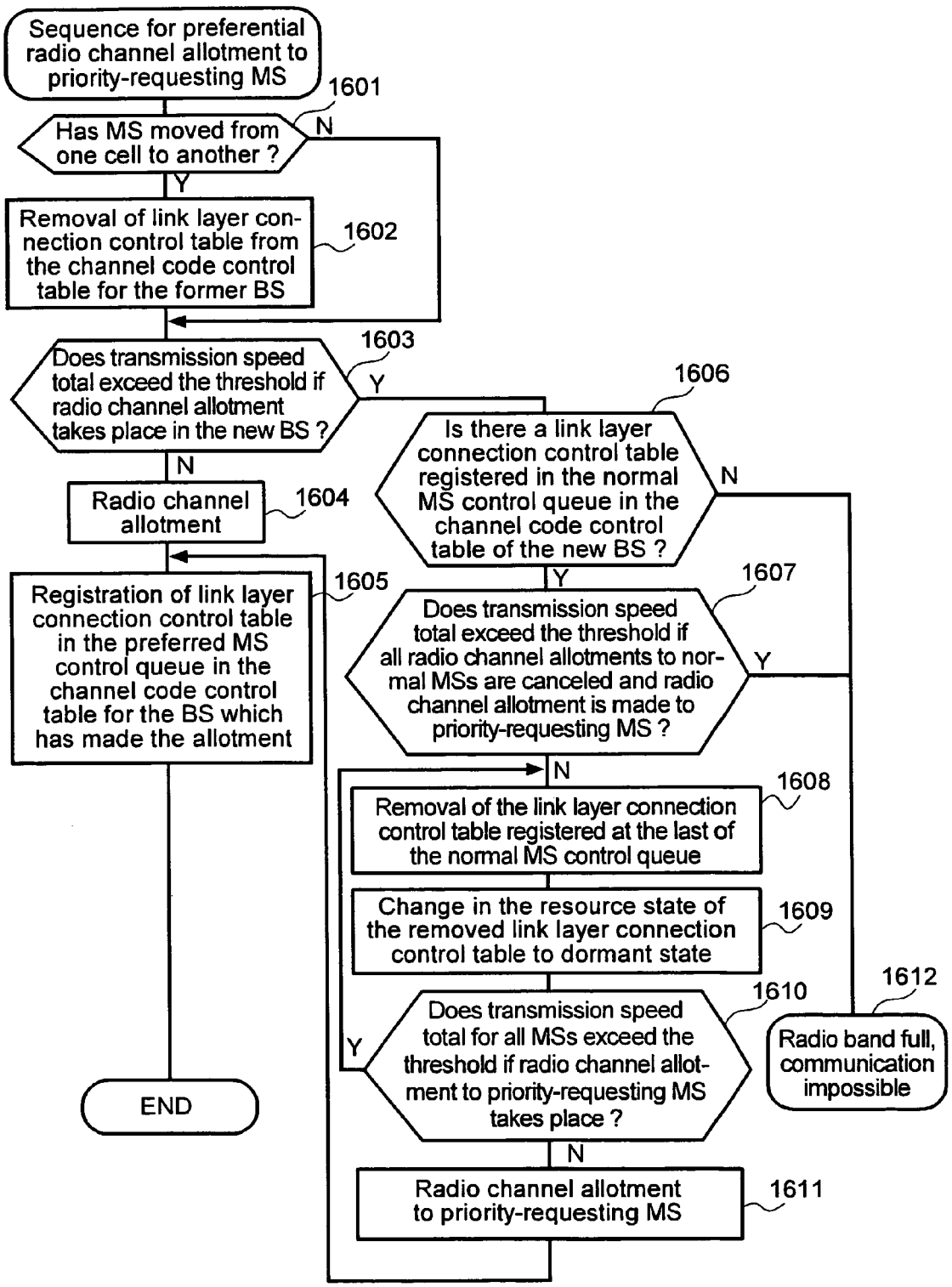
FIG. 16 is a flowchart showing a processing sequence for radio channel assignment in BSC when the priority-requesting mobile station requests radio channel assignment.

FIG. 16 shows a flowchart of a representative control process for assigning a radio channel to a priority-requesting mobile station preferentially in a particular embodiment according to the present invention. This processing is executed by the processor 503 in the control section 501 of BSC 105, for example. In FIG. 16, a priority-requesting mobile station MS 102 is in its active state 702 and moves between base stations BS 104 (cells 103), or a priority-requesting mobile station MS 102 shifts from the null state 701 or dormant state 703 into the active state 702. When a mobile station MS 102 moves from one cell to another, this movement is detected in a step 1601. Then, in a step 1602, the link layer connection control table 1301 for that mobile station is removed from the channel code control table 1401 corresponding to the former base station BS 103. In a step 1603, utilizing the link layer connection control table as shown in FIG. 13, calculation is made for uplink and downlink channels separately to find the transmission speed total for all mobile stations in their active state under the control of the new BS 103 to which a radio channel assignment request is made; and then according to the radio channel assignment request packet received from the priority-requesting MS 102 or the transmission speed of the channel used by the MS 102 before its movement, it is judged whether or not a preset threshold will be exceeded if the transmission speed as requested by the priority-requesting MS 102 is assigned to the MS. Alternatively, judgment may be made as to whether the threshold as shown in FIG. 3 will be exceeded by the result of calculation from the transmission speed total for each of the uplink and downlink channels in case of radio channel assignment being made to the priority-requesting MS 102, as well as the interference signal level calculated by the processor 503. If the threshold is not to be exceeded, then, in a step 1604, radio channel assignment is made to the MS 102 and the link layer connection control table 1301 is registered at the top of the preferred mobile station control queue 1402 in the channel code control table 1401 corresponding to the new BS102 in a step 1605. Otherwise, if the threshold would be exceeded, in a step 1606, a judgment is made as to whether there is a link layer connection control table 1302 registered in the normal mobile station control queue 1403 in the channel code control table 1401 of the new BS 103. If there is no link layer connection control table 1301 registered in the normal mobile station control queue 1403, it is impossible to make radio channel assignment to the priority-requesting mobile station because all radio channels are in use by preferred mobile stations, as indicated by step 1612. If there is a link layer connection control table 1301 registered in the normal mobile station control queue 1403, then in a step 1607, a judgment is made as to whether, if radio channel assignments for normal or non-preferred mobile stations whose link layer connection tables are registered in the normal mobile station control queue 1403 are all canceled and radio channel assignment is made to the priority-requesting mobile station, the transmission speed total will exceed the threshold. Alternatively, judgment may be made as to whether, by calculating the interference level and transmission speed total for the case that radio channel assignment for all normal mobile stations are canceled and radio channel assignment is made to the priority-requesting mobile station, the interference level will exceed the threshold as shown in FIG. 3. If the transmission speed total or the interference level is to exceed the threshold, then it is impossible to make radio channel assignment to the priority-requesting mobile station, as indicated by step 1612. In any case other than the above, the normal mobile stations whose link layer connection control tables 1301 are registered in the normal mobile station control queue 1403 are canceled for radio channel assignments in reverse order of registration, or on the basis of first cancellation of last registered mobile station, until the transmission speed total for all mobile stations or the interference level comes below the threshold if radio channel assignment is made to the priority-requesting mobile station, thus forcing them to shift into the dormant state, indicated by steps 1608, 1609 and 1610. Then, in a step 1611, a radio channel freed from a normal mobile station or non-preferred MS is assigned to the priority-requesting mobile station and, in a step 1605, the link layer connection control table 1301 for the priority-requesting mobile station is registered at the top of the preferred mobile station control queue in the channel code control table corresponding to the base station which has made the assignment.

Thus, in representative embodiments according to the present invention, when the user or the application in use needs communication quality assurance, by having the mobile station concerned periodically send a packet to request preferential use of a radio channel, it is possible to prevent timeout of the state transition timer, which counts the timing of transition from the active state to the dormant state, so that the priority-requesting mobile station can hold the radio channel continuously.

Furthermore, the base station controller is provided with means to separately control, for each cell, radio channels used preferentially by preferred mobile stations and radio channels used by normal mobile stations, as well as means to control the radio channels in use by normal mobile stations in the order of length of time which has elapsed after transmission or reception of the last signal. When a priority-requesting mobile station moves from one cell to another, or when the priority-requesting mobile station requests radio channel assignment, if there is no free channel in the cell, a normal mobile station among the ones in the cell which have been assigned radio channels is forced to be canceled for the radio channel assignment, in the descending order of length of time which has elapsed after transmission or reception of the final signal, and the mobile station thus canceled is forced to shift from the active state into the dormant state, while the radio channel thus freed is assigned to the priority-requesting mobile station, which makes it possible that the priority-requesting mobile station can hold the radio channel preferentially as it moves to another cell, or can be assigned a radio channel preferentially when newly requesting radio channel assignment.

The preceding has been a description of the preferred embodiment of the invention. It will be appreciated that deviations and modifications can be made without departing from the scope of the invention, which is defined by the appended claims.

What is claimed is:

1. A mobile station for wireless communication with a base station, said mobile station having a control section comprising:

a CPU, a memory, a bus, connecting said CPU, said memory to a transmission and reception processor;

a PPP keep alive timer and a wireless channel state timer, wherein said point-to-point protocol (PPP) keep alive timer and said wireless channel state timer are set to operate in parallel;

wherein when said mobile station requests preferential use of a wireless communication channel, said wireless communication channel having been assigned by said base station, said CPU periodically causes sending of a priority request to said base station via said transmission/reception processor;

wherein said PPP keep alive timer begins counting from a time of one of a last signal transmission and a last signal reception; and wherein upon timeout of said PPP keep alive timer, said control section causes sending of said base station said priority request, and restarts said PPP keep alive timer.

2. The mobile station as defined in claim 1, wherein, if said radio channel is used preferentially, said control section sets a counting period for said PPP keep alive timer to a value smaller than a channel holding period, said channel holding period being a time measured from any of a last signal transmission and a last signal reception, and until said base station cancels a radio channel assignment to said mobile station.

3. The mobile station as defined in claim 2, wherein said wireless channel state timer counts said channel holding period; and wherein if said wireless channel state timer reaches said channel holding period, said control section discontinues sending said priority request.

\* \* \* \* \*